United States Patent
Tanaka et al.

(10) Patent No.: US 10,160,858 B2
(45) Date of Patent: Dec. 25, 2018

(54) GOLF BALL

(71) Applicant: Dunlop Sports Co. Ltd., Kobe-shi, Hyogo (JP)

(72) Inventors: Mami Tanaka, Kobe (JP); Toshiyuki Tarao, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 41 days.

(21) Appl. No.: 15/337,825

(22) Filed: Oct. 28, 2016

(65) Prior Publication Data

US 2017/0121524 A1 May 4, 2017

(30) Foreign Application Priority Data

Oct. 29, 2015 (JP) .................................. 2015-212694

(51) Int. Cl.
| | |
|---|---|
| *A63B 37/12* | (2006.01) |
| *C08L 75/04* | (2006.01) |
| *A63B 37/00* | (2006.01) |
| *C08L 9/00* | (2006.01) |
| *C08L 33/02* | (2006.01) |
| *C08G 83/00* | (2006.01) |
| *C08L 5/16* | (2006.01) |

(52) U.S. Cl.
CPC ............ *C08L 75/04* (2013.01); *A63B 37/005* (2013.01); *A63B 37/0023* (2013.01); *A63B 37/0031* (2013.01); *A63B 37/0033* (2013.01); *A63B 37/0037* (2013.01); *A63B 37/0062* (2013.01); *A63B 37/0063* (2013.01); *A63B 37/0074* (2013.01); *C08G 83/007* (2013.01); *C08L 5/16* (2013.01); *C08L 9/00* (2013.01); *C08L 33/02* (2013.01); *C08L 2205/02* (2013.01); *C08L 2207/04* (2013.01)

(58) Field of Classification Search
None
See application file for complete search history.

(56) References Cited

U.S. PATENT DOCUMENTS

| | | | | |
|---|---|---|---|---|
| 6,193,920 | B1* | 2/2001 | Moriyama | B29C 39/10 264/250 |
| 6,417,282 | B2* | 7/2002 | Takesue | A63B 37/0003 524/487 |
| 2005/0137030 | A1* | 6/2005 | Sullivan | A63B 37/0003 473/371 |
| 2011/0143865 | A1* | 6/2011 | Shiga | A63B 37/0003 473/378 |
| 2012/0052985 | A1 | 3/2012 | Shiga et al. | |
| 2013/0053174 | A1* | 2/2013 | Shiga | C08G 18/4854 473/371 |
| 2013/0164480 | A1* | 6/2013 | Sakurai | B32B 37/08 428/56 |
| 2016/0122605 | A1* | 5/2016 | Hayashi | C09D 167/04 525/54.3 |
| 2017/0165530 | A1* | 6/2017 | Tachibana | A63B 37/0096 |
| 2017/0173401 | A1* | 6/2017 | Kamino | A63B 37/027 |
| 2017/0369704 | A1* | 12/2017 | Hayashi | C08G 18/48 |

FOREIGN PATENT DOCUMENTS

| | | | |
|---|---|---|---|
| JP | 201245223 A | | 3/2012 |
| WO | WO-2005/052026 | * | 6/2005 |
| WO | WO-2005/080469 | * | 9/2005 |
| WO | WO-2016/114243 | * | 7/2016 |

OTHER PUBLICATIONS

Kurahashi, Shape Memory Properties of Polyurethane/Poly(oxyethylene) Blends; Soft Matter, 2012, vol. 8 p. 496-503. (Year: 2012).*

* cited by examiner

*Primary Examiner* — David J Buttner
(74) *Attorney, Agent, or Firm* — Birch, Stewart, Kolasch & Birch, LLP (57) ABSTRACT

An object of the present invention is to provide a golf ball having an excellent spin performance on approach shots under a wet condition. The present invention provides a golf ball comprising a spherical core and a cover covering the spherical core, wherein the cover is formed from a cover composition containing (A) a polyurethane and (B) a polyrotaxane as a resin component, and wherein (B) the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

18 Claims, 1 Drawing Sheet

GOLF BALL

FIELD OF THE INVENTION

The present invention relates to a golf ball comprising a spherical core and a cover.

DESCRIPTION OF THE RELATED ART

For a golf ball, not only a flight performance on driver shots but also an approach performance on short iron shots is required. As a method for improving the approach performance, a method of appropriately selecting a cover material of the golf ball can be exemplified. Appropriately selecting a cover material can control the approach performance on shots of 40 yards or more.

In addition, the spin rate on approach shots under a wet condition such as a rainy day tends to be lowered. If the spin rate is lowered, the approach performance is lowered. For this reason, a golf ball cover material capable of maintaining a high spin rate even under a wet condition has been proposed. For example, Japanese Patent Publication No. 2012-045223 A discloses a golf ball, wherein a cover thereof is formed from a golf ball cover material having shear loss moduli G1" (Pa) (measuring conditions: shear mode, oscillation frequency 10 Hz, temperature 0° C., strain 0.05%), G2" (Pa) (measuring conditions: shear mode, oscillation frequency 10 Hz, temperature −30° C., strain 0.05%), and G3" (Pa) (measuring conditions: shear mode, oscillation frequency 10 Hz, temperature 0° C., strain 5%) satisfying log G1"≤7.09, log G2"≥7.17, and log G3"≤7.14, when measured using a dynamic viscoelasticity measuring apparatus (refer to claim 8 and paragraph 0021 of Japanese Patent Publication No. 2012-045223 A).

SUMMARY OF THE INVENTION

As described above, a golf ball showing an improved spin rate under a wet condition has been proposed. However, there is still large room for improvement on the spin rate under a wet condition. The present invention has been made in view of the abovementioned circumstances, and an object of the present invention is to provide a golf ball having an excellent spin performance on approach shots under a wet condition.

The present invention that has solved the above problems provides a golf ball comprising a spherical core and a cover covering the spherical core, wherein the cover is formed from a cover composition containing (A) a polyurethane and (B) a polyrotaxane as a resin component, and wherein (B) the polyrotaxane has a cyclodextrin, a linear molecule piercing through a cyclic structure of the cydodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

According to the present invention, a golf ball having an excellent spin performance on approach shots under a wet condition is obtained.

DESCRIPTION OF THE PREFERRED EMBODIMENT

The present invention provides a golf ball comprising a spherical core and a cover covering the spherical core, wherein the cover is formed from a cover composition containing (A) a polyurethane and (B) a polyrotaxane as a resin component, and wherein (B) the polyrotaxane has a cydodextrin, a linear molecule piercing through a cyclic structure of the cyclodextrin, and blocking groups located at both terminals of the linear molecule to prevent disassociation of the cyclodextrin, and at least a part of hydroxyl groups of the cydodextrin is modified with a caprolactone chain via —O—$C_3H_6$—O— group. It is noted that the cover is the outermost layer of the golf ball body (excluding a paint film).

[Cover Composition]

The cover composition contains (A) a polyurethane and (B) a polyrotaxane as a resin component. If the cover composition contains (A) the polyurethane and (B) the polyrotaxane, the spin performance of the golf ball on approach shots under a wet condition improves.

(A) Polyurethane (A) The polyurethane is not particularly limited, as long as it has a plurality of urethane bonds in the molecule and exhibits thermoplasticity. (A) The polyurethane is, for example, a reaction product obtained by reacting a polyisocyanate with a polyol to have urethane bonds formed in the molecule. Further, a chain extension reaction with a low molecular weight polyol, polyamine or the like is performed if necessary.

The polyisocyanate component constituting (A) the polyurethane is not particularly limited, as long as it has at least two isocyanate groups, and examples thereof include an aromatic polyisocyanate, an alicyclic polyisocyanate or aliphatic polyisocyanate. Examples of the aromatic polyisocyanate include 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI). Examples of the alicyclic polyisocyanate or aliphatic polyisocyanate include 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate may be used solely or as a mixture of at least two of them.

In view of improving the abrasion resistance, the aromatic polyisocyanate is preferably used as the polyisocyanate component of (A) the polyurethane. Use of the aromatic polyisocyanate enhances the mechanical property of the obtained polyurethane and provides a cover having an excellent abrasion resistance. In addition, in view of improving the weather resistance, as the polyisocyanate component of (A) the polyurethane, a non-yellowing type polyisocyanate (e.g. TMXDI, XDI, HDI, $H_6$XDI, IPDI, $H_{12}$MDI and NBDI) is preferably used, 4,4'-dicyclohexylmethane diisocyanate ($H_{12}$MDI) is more preferably used. Since 4,4'-dicyclohexylmethane diisocyanate ($H_{12}$MDI) has a rigid structure, the mechanical property of the resulting polyurethane is enhanced, and thus a cover having an excellent abrasion resistance is obtained.

The polyol component constituting (A) the polyurethane is not particularly limited as long as it has a plurality of hydroxyl groups, and examples thereof include a low molecular weight polyol and a high molecular weight polyol. Examples of the low molecular weight polyol include a diol such as ethylene glycol, diethylene glycol, triethylene glycol, propanediol (e.g. 1,2-propanediol, 1,3-propanediol, 2-methyl-1,3-propanediol, and the like), dipropylene glycol, butanediol (e.g. 1,2-butanediol, 1,3-butanediol, 1,4-butanediol, 2,3-butanediol, 2,3-dimethyl-2,3-butanediol, and the like), neopentyl glycol, pentanediol, hexanediol, heptanediol, octanediol, 1,6-cyclohexanedimethylol, aniline diol, and bisphenol A type diol; a triol such as glycerin, trimethylolpropane, and hexanetriol; and tetraol or hexol such as pentaerythritol and sorbitol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The polyol may be used solely or as a mixture of at least two of them. As the polyol, the diol is preferred. If the diol is used, a linear thermoplastic polyurethane is obtained, and thus molding the cover composition into the cover becomes easier.

The number average molecular weight of the high molecular weight polyol, for example, is preferably 400 or more, more preferably 1,000 or more, without particular limitation. If the number average molecular weight of the high molecular weight polyol is excessively small, the obtained polyurethane is so hard that the shot feeling of the golf ball may be lowered. The upper limit of the number average molecular weight of the high molecular weight polyol is preferably 10,000, more preferably 8,000, without particular limitation. It is noted that the number average molecular weight may be measured by gel permeation chromatography (GPC), using polystyrene as a standard material, tetrahydrofuran as an eluate, and two of TSK-GEL SUPERH2500 (available from Tosoh Corporation) as a column.

In addition, the polyamine used where necessary and constituting (A) the polyurethane is not particularly limited, as long as it has at least two amine groups. Examples of the polyamine include an aliphatic polyamine, an alicyclic polyamine, and an aromatic polyamine. Examples of the aliphatic polyamine include ethylenediamine, propylenediamine, butylenediamine, and hexamethylenediamine. Examples of the alicyclic polyamine include isophoronediamine and piperazine.

The aromatic polyamine is not particularly limited, as long as it has at least two amino groups directly or indirectly bonded to an aromatic ring. Herein, the "indirectly bonded to an aromatic ring" means that the amino group is bonded to an aromatic ring via, for example, a lower alkylene group. The aromatic polyamine includes, for example, a monocyclic aromatic polyamine having at least two amino groups bonded to one aromatic ring, or a polycyclic aromatic polyamine having at least two aminophenyl groups each having at least one amino group bonded to one aromatic ring.

Examples of the monocyclic aromatic polyamine include a type wherein amino groups are directly bonded to an aromatic ring, such as phenylenediamine, tolylenediamine, diethyltoluenediamine, and dimethyithiotoluenediamine; and a type wherein amino groups are bonded to an aromatic ring via a lower alkylene group, such as xylylenediamine. Further, the polycyclic aromatic polyamine may be either a poly(aminobenzene) having at least two aminophenyl groups directly bonded to each other, or a compound having at least two aminophenyl groups bonded to each other via a lower alkylene group or an alkylene oxide group. Among them, a diaminodiphenylalkane having two aminophenyl groups bonded to each other via a lower alkylene group is preferable, 4,4'-diaminodiphenylmethane and a derivative thereof is particularly preferable.

The constitutional embodiments of (A) the polyurethane are not particularly limited, and examples thereof include an embodiment where (A) the polyurethane is formed from a polyisocyanate component and a high molecular weight polyol component; an embodiment where (A) the polyurethane is formed from a polyisocyanate component, a high molecular weight polyol component and a low molecular weight polyol component; an embodiment where (A) the polyurethane is formed from a polyisocyanate component, a high molecular weight polyol component, a low molecular weight polyol component and a polyamine component; and an embodiment where (A) the polyurethane is formed from a polyisocyanate component, a high molecular weight polyol component and a polyamine component.

(A) The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. The thermosetting polyurethane is a polyurethane obtained through a curing reaction between a relatively low molecular weight prepolymer and a curing agent for use. By controlling the number of the functional group of the prepolymer or the curing agent to be used, a thermosetting polyurethane having a three-dimensional crosslinked structure is obtained. As (A) the polyurethane, a thermoplastic polyurethane is preferred, a thermoplastic polyurethane elastomer having elasticity at a room temperature is particularly preferred.

The loss modulus of elasticity E" of (A) the polyurethane is preferably $5.0 \times 10^6$ Pa or more, more preferably $7.0 \times 10^6$ Pa or more, even more preferably $9.0 \times 10^6$ Pa or more, and is preferably $5.0 \times 10^7$ Pa or less, more preferably $4.8 \times 10^7$ Pa or less, even more preferably $4.5 \times 10^7$ Pa or less. If the loss modulus of elasticity E" is $5.0 \times 10^6$ Pa or more, the spin rate on driver shots is lowered, and if the loss modulus of elasticity E" is $5.0 \times 10^7$ Pa or less, the spin rate on approach shots is further increased.

The slab hardness of (A) the polyurethane is preferably 74 or more, more preferably 76 or more, even more preferably 78 or more, and is preferably 94 or less, more preferably 92 or less, even more preferably 90 or less in Shore A hardness. If the slab hardness is 74 or more, the spin rate on driver shots is lowered, and if the slab hardness is 94 or less, the spin rate on approach shots is further increased.

Specific examples of (A) the polyurethane include Elastollan (registered trademark) XNY80A, XNY82A, XNY84A, XNY86A, XNY88A and 1190ATR available from BASF Japan Ltd.

(B) Polyrotaxane (B) The polyrotaxane has a cyclodextrin, a linear molecule piercing through the cyclic structure of the cydodextrin, and blocking groups located at both terminals of the linear molecule to prevent disassociation of the cydodextrin. The polyrotaxane is viscoelastic, since the cydodextrin molecule is movable along the linear molecule that penetrates the cydodextrin in a skewerring manner (pulley effect). Even if a tension is applied to the polyrotaxane, the tension can be uniformly dispersed due to the pulley effect.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cydodextrin include α-cyclodextrin (number of glucose units: 6), β-cyclodextrin (number of glucose units: 7), and γ-cyclodextrin (number of glucose units: 8), and α-cydodextrin is preferable. As the cydodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule can easily react with the blocking group. Examples of the functional group include a hydroxyl group, carboxyl group, amino group, and thiol group.

The blocking groups are not particularly limited, as long as they are located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins which the linear molecule pierces through preferably ranges from 0.06 to 0.61, more preferably ranges from 0.11 to 0.48, even more preferably ranges from 0.24 to 0.41, if the maximum piercing amount is deemed as 1. This is because if the piercing amount is less than 0.06, the pulley effect may not be exerted, and if the piercing amount exceeds 0.61, the cyclodextrins are very densely located, so that the movability of the cydodextrin may decrease.

As the polyrotaxane used in the present invention, a polyrotaxane having at least a part of hydroxyl groups of the cyclodextrin being modified with a caprolactone chain, is preferred. Modifying with the caprolactone enhances the compatibility of the polyrotaxane with the polyurethane. Further, modifying with the caprolactone enhances the flexibility of the polyrotaxane, thereby enhancing the spin performance of the golf ball under a wet condition.

As the above modification, for example, the hydroxyl groups of the cyclodextrin are treated with propylene oxide to hydroxylalkylate the cyclodextrin, and then ε-caprolactone is added to perform ring-opening polymerization. As a result of this modification, the caprolactone chain —(CO(CH$_2$)$_5$O)nH (n is a natural number of 1 to 100) is linked to the exterior side of the cyclic structure of the cyclodextrin via —O—C$_3$H$_6$—O— group. "n" represents the degree of polymerization, and is preferably a natural number of 1 to 100, more preferably a natural number of 2 to 70, even more preferably a natural number of 3 to 40. At the other end of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the flexibility of the polyrotaxane is greater, and thus the spin performance of the golf ball under a wet condition is further enhanced.

The hydroxyl value of the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of the polyrotaxane falls within the above range, the compatibility of the polyrotaxane with the polyurethane elastomer becomes better. It is noted that the hydroxyl value may be measured according to JIS K 1557-1, for example, by an acetylation method.

The total molecular weight of the polyrotaxane is preferably 30,000 or more, more preferably 40,000 or more, even more preferably 50,000 or more, and is preferably 3,000,000 or less, more preferably 2,500,000 or less, even more preferably 2,000,000 or less, in a weight average molecular weight. If the weight average molecular weight is 30,000 or more, the cover composition has greater elasticity, and if the weight average molecular weight is 3,000,000 or less, the cover composition has greater flexibility and thus the approach performance of the golf ball becomes better. It is noted that the weight average molecular weight may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of the polyrotaxane modified with the polycaprolactone include SeRM (registered trademark) super polymer SH3400P, SH2400P, and SH1310P available from Advanced Softmaterials Inc.

The amount of (B) the polyrotaxane is preferably 1 part by mass or more, more preferably 3 parts by mass or more, even more preferably 5 parts by mass or more, and is preferably 50 parts by mass or less, more preferably 20 parts by mass or less, even more preferably 10 parts by mass or less, with respect to 100 parts by mass of (A) the polyurethane elastomer. If the amount is 1 part by mass or more, the approach spin performance of the golf ball under a wet condition is further enhanced, and if the amount is 50 parts by mass or less, the moldability of the cover composition is enhanced and thus a thinner cover may be molded.

The cover composition may further contain other resin component than (A) the polyurethane and (B) the polyrotaxane as a resin component, as long as it does not impair the inventive effect. Examples of the other resin component include an ionomer resin and a thermoplastic elastomer. The ionomer resin includes, for example, a product prepared by neutralizing at least a part of carboxyl groups in a binary copolymer composed of ethylene and an α,β-unsaturated carboxylic acid having 3 to 8 carbon atoms with a metal ion; a product prepared by neutralizing at least a part of carboxyl groups in a ternary copolymer composed of ethylene, an α,β-unsaturated carboxylic acid having 3 to 8 carbon atoms and an α,β-unsaturated carboxylic acid ester with a metal ion, or a mixture of those. Specific examples of the ionomer resin include "Himilan (registered trademark)" available from Du Pont-Mitsui Polychemicals Co., Ltd., "Surtyn (registered trademark)" available from E.I. du Pont de Nemours and Company, and "Iotek (registered trademark)" available from ExxonMobil Chemical Corporation. Specific examples of the thermoplastic elastomer include a thermoplastic polyamide elastomer having a trade name of "Pebax (registered trademark) (e.g. "Pebax 2533")" available from Arkema K. K.; a thermoplastic polyester elastomer having a trade name of "Hytrel (registered trademark) (e.g. "Hytrel 3548", "Hytrel 4047")" available from Du Pont-Toray Co., Ltd.; a thermoplastic polystyrene elastomer having a trade name of "Rabalon (registered trademark)" available from Mitsubishi Chemical Corporation; and the like.

In the case that the other resin component is used as the resin component constituting the cover composition, the total amount of (A) the polyurethane and (B) the polyrotaxane in the total resin component is preferably 85 mass % or more, more preferably 90 mass % or more, even more preferably 95 mass % or more. The resin component may consist of (A) the polyurethane and (B) the polyrotaxane.

In addition to the above resin component, the cover composition may further contain a pigment component such as titanium oxide, a blue pigment or the like; a weight adjusting agent such as calcium carbonate, barium sulfate or the like; a dispersant; an antioxidant; an ultraviolet absorber; a light stabilizer; a fluorescent material or a fluorescent brightener; and the like, as long as they do not impair the performance of the cover. In addition, the amount of the component other than the resin composition in the cover composition is preferably 10 parts by mass or less, more preferably 5 parts by mass or less, with respect to 100 parts by mass of the resin component.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment exceeds 10 parts by mass, the durability of the obtained cover may deteriorate.

The loss modulus of elasticity E" of the cover composition is preferably $6.0 \times 10^6$ Pa or more, more preferably $9.0 \times 10^6$ Pa or more, even more preferably $1.2 \times 10^7$ Pa or more, and is preferably $5.0 \times 10^7$ Pa or less, more preferably $4.9 \times 10^7$ Pa or less, even more preferably $4.8 \times 10^7$ Pa or less. If the loss modulus of elasticity E" is $6.0 \times 10^6$ Pa or more, the spin rate on driver shots is lowered, and if the loss modulus of elasticity E" is $5.0 \times 10^7$ Pa or less, the spin rate on approach shots under a wet condition is further increased.

The slab hardness of the cover composition is preferably 74 or more, more preferably 76 or more, even more preferably 78 or more, and is preferably 94 or less, more preferably 92 or less, even more preferably 90 or less in Shore A hardness. If the slab hardness is 74 or more, the spin rate on driver shots is lowered, and if the slab hardness is 94 or less, the spin rate on approach shots is further increased.

The cover composition may be obtained, for example, by dry blending the component (A), the component (B), and additives that are blended where necessary. Further, the dry blended mixture may be extruded into a pellet form. In the dry blending, for example, a mixer capable of blending raw materials in a pellet form is preferably used, a tumbler type mixer is more preferably used. The extrusion can be carried out using a publicly known extruder such as a single-screw extruder, a twin-screw extruder, and a twin-screw/single-screw extruder.

[Golf Ball]

The construction of the golf ball of the present invention is not particularly limited, as long as it is a golf ball comprising a spherical core and a cover covering the spherical core. Examples of the construction of the golf ball include a two-piece golf ball having a single layered spherical core and a cover covering the spherical core; a three-piece golf ball having a spherical core composed of a center and a single layered intermediate layer covering the center, and a cover covering the spherical core; a four-piece golf ball having a spherical core composed of a center and a dual layered intermediate layer covering the center, and a cover covering the spherical core; and the like.

The core may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its super resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In the case that the α,β-unsaturated carboxylic acid having 3 to 8 carbon atoms is used as the co-crosslinking agent, a metal compound (e.g. magnesium oxide) is preferably used. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 5 parts by mass or less, more preferably 3 parts by mass or less, with respect to 100 parts by mass of the base rubber.

In addition, the core rubber composition may further contain an organic sulfur compound. As the organic sulfur compound, diphenyl disulfides, thiophenols or thionaphthols are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, an aliphatic carboxylic acid or an aromatic carboxylic acid (e.g. benzoic acid) may be used. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

In the case that the spherical core has an intermediate layer, examples of the intermediate layer material include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product prepared by neutralizing at least a part of carboxyl groups in a binary copolymer composed of ethylene and an α,β-unsaturated carboxylic acid with a metal ion; and a product prepared by neutralizing at least a part of carboxyl groups in a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, and a pigment.

The method for forming the intermediate layer is not particularly limited, and examples thereof include a method which comprises molding the intermediate layer composition into hemispherical half shells in advance, covering the spherical body with two of the half shells, and subjecting the spherical body with two of the half shells to the compression molding; and a method which comprises injection molding the intermediate layer composition directly onto the spherical body so as to cover the spherical body.

In case of injection molding the intermediate layer composition onto the spherical body to form the intermediate layer, it is preferred to use upper and lower molds, each having a hemispherical cavity, for forming the intermediate layer. When molding the intermediate layer by the injection molding, the hold pin is protruded to hold the spherical body, and the heated and melted intermediate layer composition is charged and then cooled to obtain the intermediate layer.

When molding the intermediate layer in the compression molding method, molding of the half shell may be conducted by either a compression molding method or an injection molding method, but the compression molding method is preferred. The compression molding of the intermediate layer composition into the half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of the method for molding the intermediate layer using half shells include a method of covering the spherical body with two of the half shells and then subjecting the spherical core with two of the half shells to the compression molding. The compression molding of the half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, an intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the composition may be measured using the thermoplastic resin composition in a pellet form under the following conditions with "Flow Tester CFT-500" available from Shimadzu Corporation.

Measuring conditions: plunger area: 1 cm$^2$, die length: 1 mm, die diameter 1 mm, load: 588.399 N, starting temperature: 30° C., and temperature increase rate: 3° C./min.

The center hardness Ho of the spherical core is preferably 40 or more, more preferably 45 or more, even more preferably 50 or more in Shore C hardness. If the center hardness Ho of the spherical core is less than 40 in Shore C hardness, the spherical core becomes so soft that the resilience thereof may be lowered. In addition, the center hardness Ho of the spherical core is preferably 70 or less, more preferably 65 or less, even more preferably 60 or less in Shore C hardness. If the center hardness Ho exceeds 70 in Shore C hardness, the spherical core becomes so hard that the shot feeling thereof may be lowered.

The surface hardness Hs of the spherical core is preferably 65 or more, more preferably 70 or more, even more preferably 75 or more, and is preferably 100 or less, more preferably 95 or less, even more preferably 90 or less in Shore C hardness. If the surface hardness of the spherical core is 65 or more in Shore C hardness, the spherical core does not become excessively soft, and thus a better resilience is obtained. In addition, if the surface hardness of the spherical core is 100 or less in Shore C hardness, the spherical core does not become excessively hard, and thus a better shot feeling is obtained.

The hardness difference (Hs−Ho) between the surface hardness Hs and the center hardness Ho of the spherical core is preferably 10 or more, more preferably 12 or more, even more preferably 15 or more, and is preferably 40 or less, more preferably 35 or less, even more preferably 30 or less in Shore C hardness. If the hardness difference between the core surface and the core center is great, the obtained golf ball has a higher launch angle and a lower spin rate on driver shots, and thus travels a greater flight distance.

The spherical core preferably has a diameter of 34.8 mm or more, more preferably 36.8 mm or more, even more preferably 38.8 mm or more, and preferably has a diameter of 42.2 mm or less, more preferably 41.8 mm or less, even more preferably 41.2 mm or less, most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from 98 N as an initial load to 1275 N as a final load to the spherical core is preferably 2.0 mm or more, more preferably 2.8 mm or more, and is preferably 6.0 mm or less, more preferably 5.0 mm or less, even more preferably 4.5 mm or less. If the compression deformation amount is 2.0 mm or more, the shot feeling becomes better, and if the compression deformation amount is 6.0 mm or less, the resilience becomes higher.

The embodiment for molding the cover composition into the cover includes, without any limitation, an embodiment which comprises injection molding the cover composition directly onto the spherical core, and an embodiment which comprises molding the cover composition into a hollow-shell, covering the spherical core with a plurality of the hollow-shells and subjecting the spherical core with a plurality of the hollow shells to the compression molding (preferably an embodiment which comprises molding the cover composition into a half hollow-shell, covering the spherical core with two of the half hollow-shells, and subjecting the spherical core with two of the half hollow-shells to the compression molding). The golf ball body having the cover formed thereon is ejected from the mold, and is preferably subjected to surface treatments such as deburring, cleaning and sandblast where necessary. In addition, if desired, a mark may be formed.

The thickness of the cover is preferably 0.3 mm or more, more preferably 0.4 mm or more, even more preferably 0.5 mm or more, and is preferably 2.0 mm or less, more preferably 1.5 mm or less, even more preferably 1.0 mm or less. If the thickness of the cover is 0.3 mm or more, the cover is easily molded, and if the thickness of the cover is 2.0 mm or less, the resilience performance of the golf ball becomes better since the core has a relatively large diameter.

The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball of the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes higher.

Figure 1:
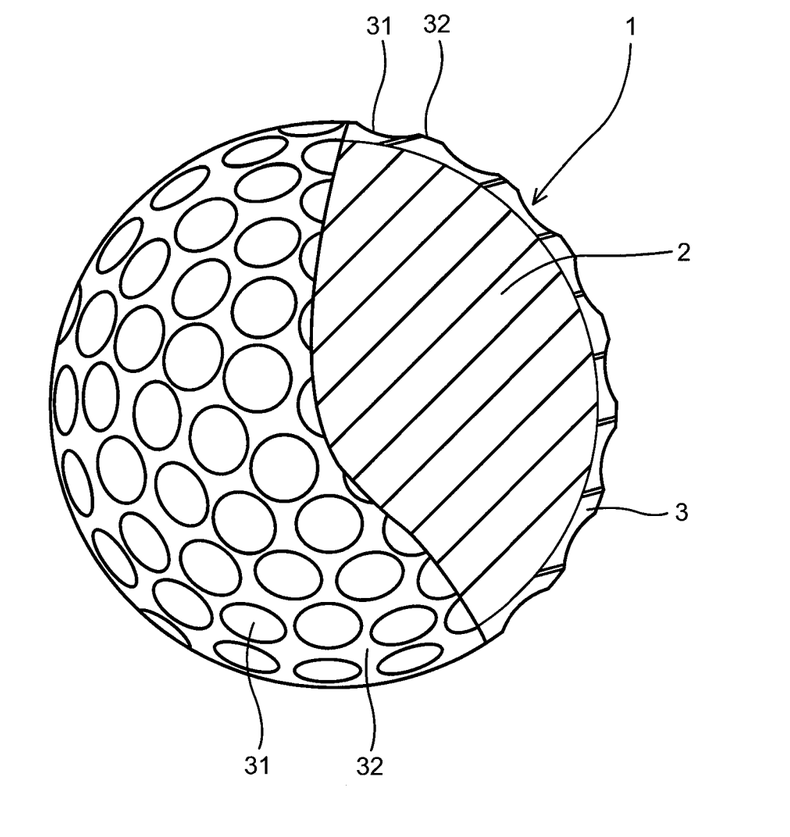
FIG. 1 is a partially cutaway sectional view showing a golf ball according to an embodiment of the present invention.

FIG. 1 is a partially cutaway sectional view showing a golf ball 1 according to an embodiment of the present invention. The golf ball 1 comprises a spherical core 2, and a cover 3 disposed outside the spherical core 2. A plurality of dimples 31 are formed on the surface of the cover 3. Other portion than the dimples 31 on the surface of the cover 3 is a land 32. The cover 3 is formed from the abovementioned cover composition.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]
(1) Compression Deformation Amount (mm)

A compression deformation amount of the core (a shrinking amount of the core along the compression direction), when applying a load from an initial load of 98 N to a final load of 1275 N to the core, was measured.

(2) Core Hardness (Shore C Hardness)

The hardness measured on the surface of the core was adopted as the surface hardness of the core. In addition, the hardness measured at the central point of a cut plane which was obtained by cutting the core into two hemispheres, was adopted as the center hardness of the core. The hardness was measured with an automatic hardness tester (Digitest II, available from Bareiss company) using a testing device of "Shore C".

(3) Slab Hardness (Shore D Hardness or Shore A Hardness)

Sheets with a thickness of about 2 mm were produced by injection molding the intermediate layer composition or the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D" or "Shore A".

(4) Measurement of Loss Modulus of Elasticity E" (Pa)

The loss modulus of elasticity E" (Pa) of the cover composition or the polyurethane was measured under the following conditions.

Apparatus: a dynamic viscoelasticity analyzer "Rheogel-E4000" available from UBM Co., Ltd.

Testing sample: a sheet with a thickness of 0.5 mm was produced by heat pressing the cover composition or the polyurethane, and a test piece was cut out from the sheet such that the test piece has a width of 4 mm and a length between the clamps of 20 mm.

Measuring mode: tensile mode
Measuring temperature: 0° C.
Oscillation frequency: 10 Hz
Measuring strain: 0.05%

(5) Spin Rate on Approach Shots (Wet Condition)

A sand wedge (RTX588BLD (58")) available from Cleveland Golf) was installed on a swing robot available from Golf Laboratories, Inc. The golf ball was hit at a head speed of 21 m/sec, and the spin rate (rpm) thereof was measured by continuously taking a sequence of photographs of the hit golf ball. The measurement was conducted ten times for each golf ball, and the average value thereof was adopted as the spin rate. It is noted that the wet spin rate (Sw) is a spin rate measured when the club face and the golf ball were in a state wetted with water. The spin rate of each golf ball is shown as a difference from the spin rate of the golf ball No. 1.

(6) Moldability

A half shell (thickness: 0.5 mm) was produced by compression molding the cover composition, and a broken or missing part in the half shell when ejecting the half shell from the mold was visually evaluated. The compression molding was conducted under the conditions of a molding temperature of 170° C., a molding time of 5 minutes and a molding pressure of 2.94 MPa. The case that neither broken nor missing part was found in the produced half shell was evaluated as "G (good)", and the case that a broken or missing part was found in the produced half shell was evaluated as "P (poor)".

[Production of Golf Ball]

(1) Production of Core

The center rubber composition having the formulation shown in Table 1 was kneaded, and heat pressed in upper and lower molds, each having a hemispherical cavity, at 170° C. for 15 minutes to obtain a spherical center (diameter 38.5 mm). Then, the intermediate layer materials, according to the formulation shown in Table 1, were extruded with a twin-screw kneading extruder to prepare an intermediate layer composition in a pellet form. The extruding conditions of the intermediate layer composition were a screw diameter of 45 mm, a screw rotational speed of 200 rpm, and screw L/D=35, and the mixture was heated to 150 to 230° C. at the die position of the extruder. The obtained intermediate layer composition was injection molded onto the center obtained above to produce a core (diameter 41.7 mm) having a center and an intermediate layer covering the center.

TABLE 1

| | | Spherical core | |
|---|---|---|---|
| Center | Formulation (parts by mass) | Polybutadiene rubber | 100 |
| | | Zinc acrylate | 38 |
| | | Zinc oxide | 5 |
| | | Diphenyl disulfide | 0.5 |
| | | Dicumyl peroxide | 1 |
| | | Diameter (mm) | 38.5 |
| Intermediate layer | Formulation (parts by mass) | Himilan 1605 | 50 |
| | | Himilan AM7329 | 50 |
| | | Slab hardness (Shore D) | 64 |
| | | Thickness (mm) | 1.6 |
| Properties | | Diameter (mm) | 41.7 |
| | | Surface hardness (Shore C) | 98 |
| | | Center hardness (Shore C) | 65 |
| | | Hardness difference (surface hardness − center hardness) (Shore C) | 33 |
| | | Compression deformation amount (mm) | 2.55 |

Polybutadiene rubber "BR730 (high cis-polybutadiene)" available from JSR Corporation Zinc acrylate: "ZNDA-90S" available from Nisshoku Techno Fine Chemical Co., Ltd.

Zinc oxide: "Ginrei R" available from Toho Zinc Co., Ltd.

Diphenyl disulfide: available from Sumitomo Seika Chemicals Co., Ltd.

Dicumyl peroxide: "Percumyl (register trademark) D" available from NOF Corporation Himilan (registered trademark) 1605: sodium ion neutralized ethylene-methacrylic acid copolymer ionomer resin available from Du Pont-Mitsui Polychemicals Co., Ltd.

Himilan AM7329: zinc ion neutralized ethylene-methacrylic acid copolymer ionomer resin available from Du Pont-Mitsui Polychemicals Co., Ltd.

(2) Molding of Half Shells

The polyurethane elastomer, the polyrotaxane and titanium oxide shown in Table 2 were dry blended, and mixed with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 150 to 230° C. at the die position of the extruder. The compression molding of half shells was conducted by charging the obtained cover composition in a pellet form into each of the depressed part of the lower mold for molding half shells, and applying pressure to mold the half shells. The compression molding was conducted under the conditions of a molding temperature of 170° C., a molding time of 5 minutes and a molding pressure of 2.94 MPa.

(3) Molding of Cover

The core obtained in (1) was concentrically covered with two of the half shells obtained in (2), and the core and two of the half shells were compression molded to form the cover. The compression molding was conducted under the conditions of a molding temperature of 145° C., a molding time of 2 minutes and a molding pressure of 9.8 MPa. The surface of the obtained golf ball body was subjected to a sandblast treatment, and a mark was formed thereon. Then, a clear paint was applied to the golf ball body, and the paint was dried in an oven of 40° C. to obtain a golf ball having a diameter of 42.7 mm and a mass of 45.3 g. Evaluation results of the spin performance of the obtained golf balls are shown in Table 2.

TABLE 2

| | | | Golf ball No. | | | | | | | |
|---|---|---|---|---|---|---|---|---|---|---|
| | | | 1 | 2 | 3 | 4 | 5 | 6 | 7 | 8 |
| Cover composition | Formulation | Elastollan XNY80A | 100 | — | — | — | — | — | 100 | — |
| | | Elastollan XNY82A | — | 100 | — | — | — | — | — | 100 |
| | | Elastollan XNY84A | — | — | 100 | — | — | — | — | — |
| | | Elastollan XNY86A | — | — | — | 100 | — | — | — | — |
| | | Elastollan XNY88A | — | — | — | — | 100 | — | — | — |
| | | Elastollan 1190ATR | — | — | — | — | — | 100 | — | — |
| | | Polyrotaxane | — | — | — | — | — | — | 10 | 10 |
| | | Titanium oxide | 4 | 4 | 4 | 4 | 4 | 4 | 4 | 4 |

TABLE 2-continued

|  |  |  |  |  |  |  |  |  |  |
|---|---|---|---|---|---|---|---|---|---|
|  | Properties | Slab hardness (Shore A) | 80 | 82 | 84 | 86 | 88 | 90 | 77 | 80 |
|  |  | Loss modulus of elasticity E" of cover composition (×10$^7$ Pa) | 1.43 | 2.72 | 3.91 | 4.20 | 4.50 | 1.26 | 2.61 | 3.45 |
|  |  | Loss modulus of elasticity E" of polyurethane elastomer (×10$^7$ Pa) | 1.43 | 2.72 | 3.91 | 4.20 | 4.50 | 1.26 | 1.43 | 2.72 |
| Evaluation |  | Wet spin rate (rpm) | 0 | 520 | 1170 | 1120 | 1010 | 1120 | 630 | 1330 |
|  |  | Moldability of cover | G | G | G | G | G | G | G | G |

|  |  |  | Golf ball No. | | | | | | | |
|---|---|---|---|---|---|---|---|---|---|---|
|  |  |  | 9 | 10 | 11 | 12 | 13 | 14 | 15 | 16 |
| Cover composition | Formulation | Elastollan XNY80A | — | — | — | — | — | — | — | — |
|  |  | Elastollan XNY82A | — | — | — | — | — | — | — | — |
|  |  | Elastollan XNY84A | 100 | 100 | 100 | 100 | 100 | — | — | — |
|  |  | Elastollan XNY86A | — | — | — | — | — | 100 | — | — |
|  |  | Elastollan XNY88A | — | — | — | — | — | — | 100 | — |
|  |  | Elastollan 1190ATR | — | — | — | — | — | — | — | 100 |
|  |  | Polyrotaxane | 5 | 10 | 20 | 40 | 60 | 10 | 10 | 10 |
|  |  | Titanium oxide | 4 | 4 | 4 | 4 | 4 | 4 | 4 | 4 |
|  | Properties | Slab hardness (Shore A) | 82 | 81 | 78 | 74 | — | 85 | 87 | 89 |
|  |  | Loss modulus of elasticity E" of cover composition (×10$^7$ Pa) | 3.58 | 4.09 | 3.55 | 3.49 | — | 4.94 | 4.72 | 1.47 |
|  |  | Loss modulus of elasticity E" of polyurethane elastomer (×10$^7$ Pa) | 3.91 | 3.91 | 3.91 | 3.91 | 3.91 | 4.20 | 4.50 | 1.26 |
| Evaluation |  | Wet spin rate (rpm) | 1490 | 1550 | 1560 | 1620 | — | 1350 | 1290 | 1330 |
|  |  | Moldability of cover | G | G | G | G | P | G | G | G |

The raw materials used in Table 2 are shown below.

Elastollan (registered trademark) NY80A: polyurethane elastomer (Shore A hardness: 80) available from BASF Japan Ltd.

Elastollan NY82A: polyurethane elastomer (Shore A hardness: 82) available from BASF Japan Ltd.

Elastollan NY84A: polyurethane elastomer (Shore A hardness: 84) available from BASF Japan Ltd.

Elastollan NY86A: polyurethane elastomer (Shore A hardness: 86) available from BASF Japan Ltd.

Elastollan NY88A: polyurethane elastomer (Shore A hardness: 88) available from BASF Japan Ltd.

Elastollan 1190ATR: polyurethane elastomer (Shore A hardness: 90) available from BASF Japan Ltd.

Polyrotaxane: "SeRM (registered trademark) super polymer SH2400P (a polyrotaxane having a cyclodextrin, at least a part of hydroxyl groups of the cyclodextrin being modified with a caprolactone chain via a —O—C$_3$H$_6$—O— group, a linear molecule of polyethylene glycol and a blocking group of an adamantyl group; molecular weight of linear molecule: 20,000; hydroxyl value of polyrotaxane: 76 mg KOH/g; total molecular weight of polyrotaxane: 400,000 in weight average molecular weight)" available from Advanced Softmaterials Inc.

The golf balls No. 7 to 12 and 14 to 16 are the cases where the cover composition contains (A) a polyurethane and (B) a polyrotaxane. These golf balls have an excellent spin performance under a wet condition, compared to the golf balls No. 1 to 6 using a cover composition not containing (B) the polyrotaxane. It is noted that, for the golf ball No. 13, a cover with a thickness of 0.5 mm failed to be formed, since the cover composition contained (B) the polyrotaxane in an excessively large amount and was brittle.

This application is based on Japanese patent application No. 2015-212694, filed on Oct. 29, 2015, the contents of which are hereby incorporated by reference.

The invention claimed is:

1. A golf ball comprising a spherical core and a cover covering the spherical core,
   wherein the cover is formed from a cover composition containing (A) a polyurethane and (B) a polyrotaxane as a resin component,
   wherein (B) the polyrotaxane has a cyclodextrin, a linear molecule piercing through a cyclic structure of the cyclodextrin, and blocking groups located at both terminals of the linear molecule to prevent disassociation of the cyclodextrin, and at least a part of hydroxyl groups of the cyclodextrin is modified with a caprolactone chain via a —O—C$_3$H$_6$—O— group, and
   wherein the cover composition contains (B) the polyrotaxane in an amount of 20 parts by mass or more and 50 parts by mass or less with respect to 100 parts by mass of (A) the polyurethane.

2. The golf ball according to claim 1, wherein the linear molecule of (B) the polyrotaxane is polyethylene glycol, and the blocking group of (B) the polyrotaxane is an adamantyl group.

3. The golf ball according to claim 1, wherein (A) the polyurethane has a loss modulus of elasticity E" of 5.0×10$^7$ Pa or less.

4. The golf ball according to claim 1, wherein the cover composition has a loss modulus of elasticity E" of 5.0×10$^7$ Pa or less.

5. The golf ball according to claim 3, wherein (A) the polyurethane has a loss modulus of elasticity E" of 5.0×10$^6$ Pa or more.

6. The golf ball according to claim 4, wherein the cover composition has a loss modulus of elasticity E" of 6.0×10$^6$ Pa or more.

7. The golf ball according to claim 1, wherein the cyclodextrin is an α-cyclodextrin.

8. The golf ball according to claim 1, wherein the linear molecule has a weight average molecular weight ranging from 5,000 to 100,000.

9. The golf ball according to claim 1, wherein (B) the polyrotaxane has a hydroxyl value ranging from 10 mgKOH/g to 400 mgKOH/g.

10. The golf ball according to claim 1, wherein (B) the polyrotaxane has a total molecular weight ranging from 30,000 to 3,000,000 in a weight average molecular weight.

11. The golf ball according to claim 1, wherein (A) the polyurethane has a slab hardness ranging from 74 to 94 in Shore A hardness.

12. The golf ball according to claim 1, wherein the cover composition has a slab hardness ranging from 74 to 94 in Shore A hardness.

13. The golf ball according to claim 1, wherein the spherical core is formed from a rubber composition.

14. The golf ball according to claim 1, wherein the spherical core has a center hardness Ho ranging from 40 to 70 in Shore C hardness.

15. The golf ball according to claim 1, wherein the spherical core has a surface hardness Hs ranging from 65 to 100 in Shore C hardness.

16. The golf ball according to claim 1, wherein the spherical core has a hardness difference (Hs−Ho) ranging from 10 to 40 in Shore C hardness between a surface hardness Hs and a center hardness Ho thereof.

17. The golf ball according to claim 1, wherein the cover has a thickness of 2.0 mm or less.

18. The golf ball according to claim 1, wherein a total amount of (A) the polyurethane and (B) the polyrotaxane in the total resin component is 85 mass % or more.

* * * * *